(12) United States Patent
Hannemann et al.

(10) Patent No.: US 9,223,038 B2
(45) Date of Patent: Dec. 29, 2015

(54) X-RAY DETECTOR WITH PHOTON-COUNTING DIRECTLY CONVERTING DETECTOR ELEMENTS AND METHOD FOR TEMPERATURE STABILIZATION OF THE X-RAY DETECTOR

(71) Applicant: Siemens Aktiengesellschaft, Munich (DE)

(72) Inventors: Thilo Hannemann, Erlangen (DE); Edgar Kraft, Forchheim (DE); Daniel Niederlohner, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 237 days.

(21) Appl. No.: 13/850,471

(22) Filed: Mar. 26, 2013

(65) Prior Publication Data
US 2013/0248729 A1    Sep. 26, 2013

(30) Foreign Application Priority Data
Mar. 26, 2012    (DE) .......................... 10 2012 204 766

(51) Int. Cl.
*G01J 1/42*    (2006.01)
*G01T 1/00*    (2006.01)
(Continued)

(52) U.S. Cl.
CPC .. *G01T 7/00* (2013.01); *G01T 1/244* (2013.01)

(58) Field of Classification Search
CPC ........................................................ A61B 6/585
USPC .................................................... 250/370.15
See application file for complete search history.

(56) References Cited

U.S. PATENT DOCUMENTS 5,248,885 A * 9/1993 Sato et al. ................ 250/370.15
7,592,587 B2   9/2009 Stein et al. ................. 250/252.1
8,093,535 B2   1/2012 Heismann et al. ............ 219/494
(Continued)

FOREIGN PATENT DOCUMENTS

DE    102005061358 A1    7/2007    ................ G01K 7/01
EP        1739459 A1    1/2007    ................ G01T 1/29
(Continued)

OTHER PUBLICATIONS

"Temperature-Constrained Power Control for Chip Multiprocessors with Online Model Estimation" to Wang et al. (hereinafter "Wang"), Department of EECS, University of Tenessee, published Jan. 22, 2010, pp. 1-16.*
(Continued)

*Primary Examiner* — David J Makiya
*Assistant Examiner* — Kenneth J Malkowski
(74) *Attorney, Agent, or Firm* — Slayden Grubert Beard PLLC

(57) ABSTRACT

An X-ray detector with photon-counting directly converting detector elements and a method for the temperature stabilization of at least one detector element of an X-ray detector of a CT system are disclosed, wherein the detector elements use a sensor material which converts incident photons of radiation directly into free-moving charge in the sensor material and wherein with the aid of a circuit arrangement (e.g. an ASIC), the number of incident photons in relation to pre-defined energy ranges (e.g., to imaging) is determined, wherein the total electrical power of at least one detector element is kept constant regardless of the incident intensity of radiation.

23 Claims, 5 Drawing Sheets

(51) Int. Cl.
*G01T 7/00* (2006.01)
*G01T 1/24* (2006.01)

(56) References Cited

U.S. PATENT DOCUMENTS

| | | | |
|---|---|---|---|
| 2007/0029496 A1* | 2/2007 | Bouhnik et al. | 250/370.15 |
| 2008/0116387 A1 | 5/2008 | Astley et al. | 250/370.15 |
| 2011/0049381 A1* | 3/2011 | Luhta et al. | 250/394 |
| 2011/0291017 A1* | 12/2011 | Frach | 250/366 |

FOREIGN PATENT DOCUMENTS

| | | | | |
|---|---|---|---|---|
| JP | 623648 A | 1/1987 | | G01N 21/77 |
| JP | 62207437 A | 9/1987 | | A61B 6/03 |
| WO | 2005/116692 A1 | 12/2005 | | G01B 5/28 |

OTHER PUBLICATIONS

German Office Action, Application No. 10 2012 204 766.2, 6 pages, Nov. 27, 2012.

Chinese Office Action, Application No. 201310098798.3, 10 pages, Dec. 2, 2014.

* cited by examiner

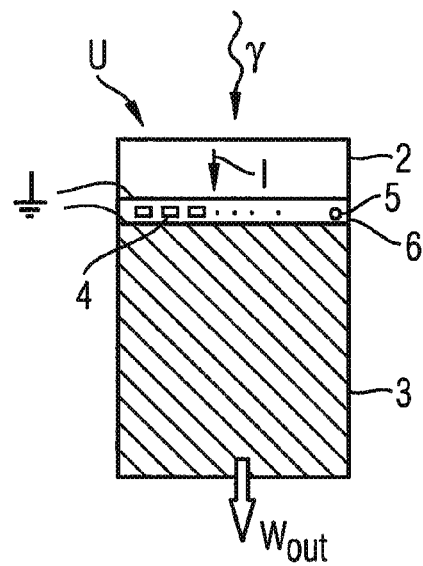
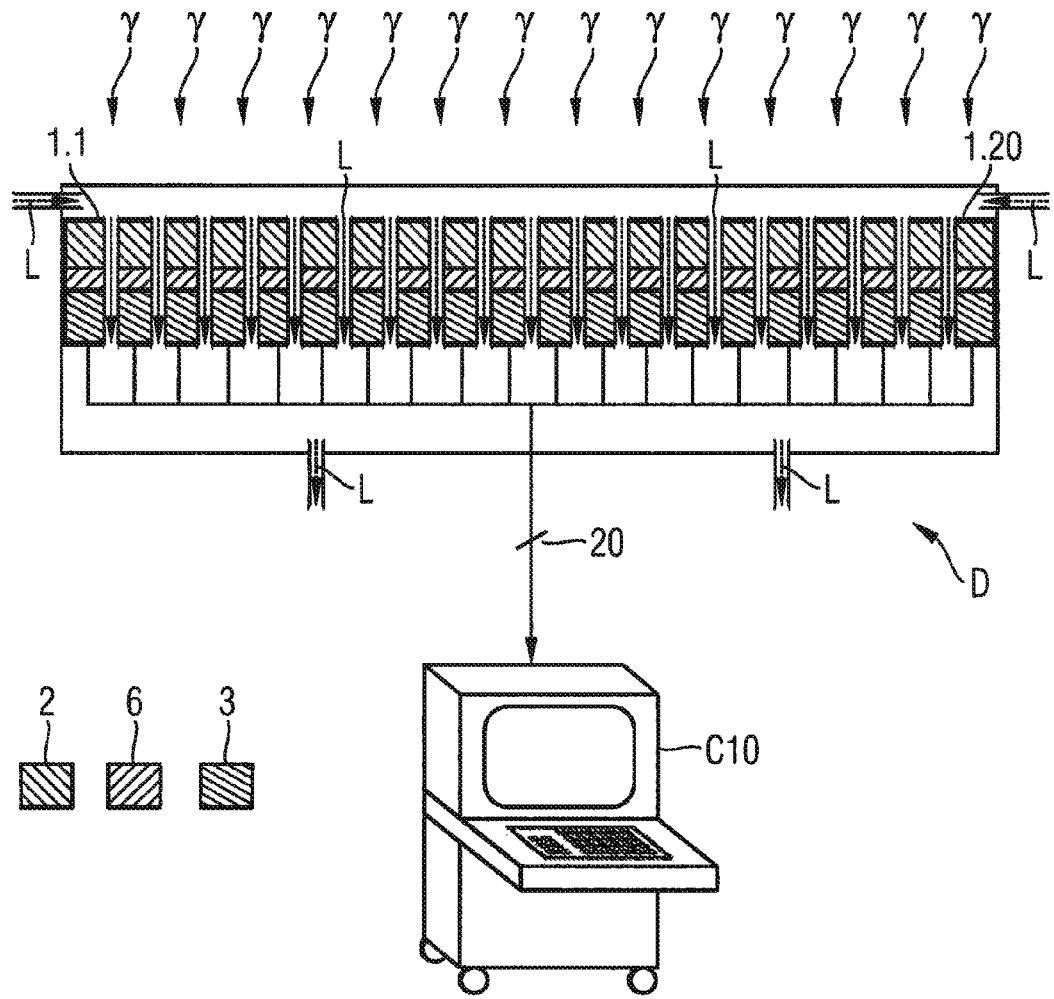

X-RAY DETECTOR WITH PHOTON-COUNTING DIRECTLY CONVERTING DETECTOR ELEMENTS AND METHOD FOR TEMPERATURE STABILIZATION OF THE X-RAY DETECTOR

CROSS-REFERENCE TO RELATED APPLICATIONS

This application claims priority to DE Patent Application No. 10 2012 204 766.2 filed Mar. 26, 2012. The contents of which is incorporated herein by reference in its entirety.

TECHNICAL FIELD

The disclosure relates to a method for temperature stabilization of at least one detector element of an X-ray detector of a CT system, wherein the detector elements use a sensor material which converts incident photons of radiation directly into free charge and with the aid of a circuit arrangement the number of incident photons is determined in relation to predefined energy ranges, in particular to imaging.

In addition, the disclosure also relates to an X-ray detector of a CT system with a variety of two-dimensionally arranged detector elements with a sensor material which converts incident photons of radiation directly into free charge, a variety of circuit arrangements, in particular ASICs, by means of which the number of incident photons is determined in relation to predefined energy ranges, in particular to imaging.

BACKGROUND

It is known to use a temperature control circuit, e.g. in the form of a PI or PID controller (PI=Proportional-Integral, PID=Proportional-Integral-Differential) for temperature stabilization in detector elements. The actual value of the controller is ascertained via a temperature sensor, the desired value is predefined in accordance with the desired temperature. Either a heating and a cooling unit or a combined heating and cooling unit, such as e.g. a Peltier element, acts as an actuator. Control is also possible using only one heating or one cooling unit if the other control direction is realized by the flow of the heat energy to a heat reservoir in the surrounding area.

Likewise it is known that a feed forward control can be implemented to reduce the control deviation of a controller. For example, reference is made to the publication DE 10 2005 061 358 A1 in which temperature stabilization takes place on the basis of temperature monitoring. A disadvantage of such a method is that on account of the inertia of the temperature measurement, control of the system can only intervene when the system has already heated up, in other words, a temperature rise has been recorded in the ASIC. As a result a response time is produced via the thermal inertia of the system, during which the temperature cannot be kept stable. Depending on the thermal inertia, the actual temperature may for a short time deviate from the desired temperature to a greater or lesser extent. This effect is particularly problematic where there are sudden, strong increases in the loaded radiation intensity, as are inevitable in computer tomography. The signal behavior of the detector changes for a short time as a result of this, which can ultimately result in artifacts in the image data which have arisen on the basis of measurement data ascertained with the detector.

In addition, reference is made to the publication WO 2005/116692 A2 identified in the examination procedure. The disclosure relates to a method for the stabilization of the signals generated by a scintillation detector for the measurement of radiation by the radiation at least partially absorbed in the detector and dependent on the operating temperature of the detector, wherein the temperature-dependent calibration factor K is determined on the basis of the waveform shape of the signals generated by the radiation to be measured itself. Only a calibration of the measured signals is therefore performed here.

SUMMARY

One embodiment provides a method for the temperature stabilization of at least one detector element of an X-ray detector of a CT system, wherein the detector elements use a sensor material, which converts incident photons of radiation directly into free-moving charge in the sensor material and wherein with the aid of a first circuit arrangement, in particular of an ASIC, the number of incident photons in relation to predefined energy ranges, in particular to imaging, is determined, wherein the total electrical power of at least one detector element is kept constant regardless of an incident intensity of radiation.

In a further embodiment, in or on the first circuit arrangement a heat-generating second circuit arrangement is arranged, wherein by means of a control system the power of the heat-generating second circuit arrangement of at least one detector element as a function of the power consumption of the first circuit arrangement and/or of the sensor material of at least one detector element is controlled in such a way that the total electrical power of at least one detector element remains constant.

In a further embodiment, for the stabilization of the total electrical power a model predictive control based on the number and/or energy of the incident photons is used.

In a further embodiment, for the stabilization of the overall electrical power consumed of at least one detector element at least one variably adjustable heating element is used.

In a further embodiment, at least one variably adjustable heating element is arranged in or on the first circuit arrangement, in particular on the ASIC.

In a further embodiment, via at least one variably adjustable heating element a proportion of a predefined reference power of the ASIC not consumed in the ASIC is emitted.

In a further embodiment, the predefined reference power is more than 50% of the maximum power, e.g., in the range of 70% to 100%, e.g., 80% to 100%, e.g., 80% to 90%, of the maximum power.

In a further embodiment, in addition via at least one variably adjustable heating element a current flow not occurring in the sensor material is compensated with respect to a current flow occurring there at a predefined incident radiation intensity.

In a further embodiment, the predefined radiation intensity is more than 50% of the maximum incident radiation intensity, e.g., in the range of 70% to 100%, e.g., 80% to 100%, e.g., 80% to 90%, of the maximum incident radiation intensity.

In a further embodiment, the incident radiation intensity is used as a measured value for a changing heat input requiring compensation over at least one heat generation element to at least one detector element.

In a further embodiment, a counting rate ascertained by means of the circuit arrangement is used as a measured value for the incident radiation intensity.

In a further embodiment, the current induced by the radiation in the sensor material is measured and used as a measured value for the incident radiation intensity.

In a further embodiment, the stabilization of the electrical power is averaged over detector elements.

In a further embodiment, the stabilization of the electrical power takes place individually for each detector element.

In a further embodiment, in addition a temperature measurement is performed in at least one detector element and an additional regulation of the temperature takes place via the temperature measurement, wherein the time constant of the temperature control is longer than the time constant of the control of the total power.

In a further embodiment, the additional control of the temperature takes place via a model predictive control.

In a further embodiment, heat dissipation always operating with the same power at least during the operation of the detector is performed.

In a further embodiment, at least during the operation of the detector heat dissipation is performed, wherein this is controlled in such a way that as small a constant proportion as possible is produced with the electrical power supplied to the X-ray detector.

In a further embodiment, a cooling air flow is used for heat dissipation.

In a further embodiment, at least one Peltier element is used for heat dissipation.

Another embodiment provides an X-ray detector of a CT system with a variety of two-dimensionally arranged detector elements with a sensor material, which converts incident photons of radiation directly into free charge, a variety of first circuit arrangements, in particular ASICs, by means of which the number of incident photons in relation to predefined energy ranges, in particular to imaging, is determined, wherein for temperature stabilization a means of influencing the total power of at least one detector element is available, by means of which the total power consumed is kept constant in at least one detector element.

In a further embodiment, the means to influence the total power of at least one detector element is a heat-generating second circuit arrangement, in particular an exclusively heat-generating second circuit arrangement, arranged in or on the ASIC.

In a further embodiment, a control system is provided which controls the power of the heat-generating circuit arrangement as a function of the other power consumption of the first circuit arrangement and/or of the sensor material.

In a further embodiment, an additional control system is provided which at least partially overlaps the control system as a function of a measured temperature on or in the detector element.

In a further embodiment, a heat dissipation device which dissipates excess heat during operation is provided.

BRIEF DESCRIPTION OF THE DRAWINGS

Exemplary embodiments will be explained in more detail below based on the schematic drawings, wherein:

FIG. 1: Detailed description of a detector element with integrated heating elements and temperature sensor for temperature stabilization, FIG. 2 shows a cross-section through a detector with a variety of directly converting detector elements with constant heat dissipation and controlled heat-generating circuit arrangements, according to an example embodiment.

DETAILED DESCRIPTION

Figure 3:
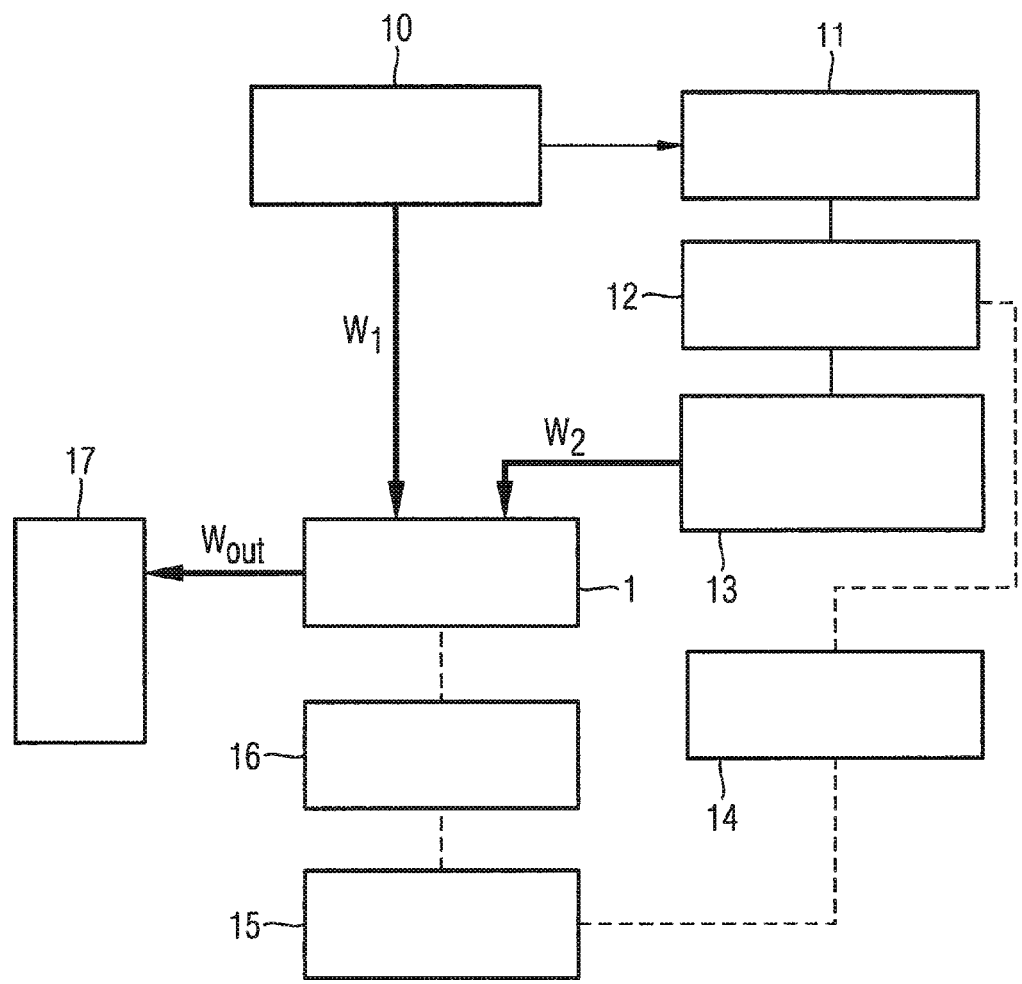
FIG. 3 shows a schematic diagram of heat regulation of a detector element.

Embodiments of the present disclosure provide a method for temperature stabilization and an improved temperature-controlled detector which react with less inertia and thus result in better signal stability.

For good clinical image quality of a computer tomograph the stability of the detector signal and the performance, for example, the linearity between the incident radiation intensity and the measuring signal, is of vital importance. However, the signal stability of counting, directly converting detectors is dependent on the temperature. On the one hand, the sensor material, e.g. CdTe, displays a dependence on the temperature, on the other hand, the performance of the ASICs with the circuits contained therein—for example: analog amplifiers, choppers, comparators, voltage references, digital-analog converters and analog-digital converters—is likewise temperature-dependent.

There are various components which introduce heat into the detector system. In the case of directly converting, counting detectors, apart from ASIC this is also the sensor material which usually comprises CdTe or CdZnTe. The charges released via the X-ray radiation produce a current I when a voltage U is applied and release a corresponding thermal output $P=I*U$. This heat is dependent on the radiation intensity and therefore varies over several orders of magnitude in time in a typical CT scan. For the ASIC as well as for other components which introduce heat, it is also frequently the case that the released heat depends on the radiation intensity and may therefore vary in terms of time.

A system should therefore be presented which is as stable as possible in terms of temperature in spite of the heat input varying over time. The relevant parts of the system are the sensor material and the signal-processing electronics, in other words the ASIC. Instead of a stable temperature of the sensor material, with a good thermal connection temperature stabilization of the ASIC can also result in a significant advantage. The permitted temperature fluctuations should be in the range of less than 1 kelvin. Furthermore, low temperatures may be preferred with regard to the performance of the sensor material, and/or predefined maximum temperatures in the range of approx. 45° C. should not be exceeded.

In some embodiments, rapid-response temperature stabilization for the minimization of the count rate drift in a photon-counting detector is therefore to be realized, wherein a reaction to a measured increase in temperature was already detected as too slow.

According to the knowledge of the inventors, the temperature in the detector can be stabilized almost without time delay by ensuring as soon as there are changing boundary conditions, which causally result in a change in temperature, such as for example the alteration of the flow of incident radiation, that the heat budget in the detector and/or individually in each detector element is kept constant by means of counteracting measures. Therefore, the initiation of countermeasures is not first triggered by a measurement of a temperature change on a sensor occurring with a time delay in relation to the causal incident, but already countered on account of the causal event which will bring about a temperature change.

In the simplest case, the power consumption of the ASIC can be kept at a constant value for this purpose, wherein this is possible without special measurement of the incident radiation intensity and as a value to be kept constant a maximum value of the power applied at maximum radiation intensity striking the detector. A suitable voltage source, composed of a power supply in combination with a z-diode, for example, can be used in the ASIC.

Another exemplary embodiment may include the varying heat input being compensated on account of varying radiation in the sensor material by opposed, proactive adjustment of heat generation in the ASIC so that the total thermal output generated in the "sensor plus ASIC including additional heat generation" system is kept constant. This therefore keeps the total thermal output at the maximum possible thermal output in this measurement at all times. The additional heat input is therefore not primarily controlled/regulated on account of a temperature measurement, but controlled as a function of a measured value which is associated with a heat-generating variable.

The current flow in the sensor material can be used as an additional measured value for heat input. This can either be measured at a higher level for the entire sensor as the current of the high voltage supply or with pixel accuracy in the ASIC with individual current measurement circuits for each detector element. Alternatively, the counting rate can also be used as a measured value for the heat input in the sensor material as it is a measure of the radiation intensity and therefore of the current flows in the sensor. With regard to the counting rate, especially the accumulated or average or typical counting rate is used here. The term "typical" relates to a median or to a random sample from a group of single pixels.

The aforementioned measured values for the current flow in the sensor material can also be used as input variables for temperature control with feed forward control as a disturbance variable.

The regulatory mechanisms may take place in two stages, by on the one hand keeping the total power consumption of the system—in other words, ASIC and CdTe or only ASIC—as constant as possible via a control system, on the other hand, in addition the temperature can be stabilized more precisely by means of control of the power consumption on the basis of a temperature measurement than by the control system. Control without major fluctuations is not enabled until the order of magnitude of the heat amount input is kept broadly constant via the control system. Both can, for example, take place on an entire sensor module with several detector elements or per detector element, in other words, with pixel accuracy or also in a combination of both or at an intermediate stage.

In all the versions the cooling from outside, which dissipates the heat, can be kept constant and therefore initially requires no additional control and/or only subordinate substantially slower control to prevent too much power from being consumed in total by opposed cooling and heating.

Accordingly, some embodiments provide a method for temperature stabilization of at least one detector element of an X-ray detector of a CT system, wherein the detector elements use a sensor material which converts incident photons of radiation directly into free charge and wherein with the aid of a circuit arrangement—in particular in the form of ASICs (ASIC=Application-Specific Integrated Circuit component)–the number of incident photons is determined with regard to predefined energy ranges, in particular to imaging, which is improved by the total electrical power of at least one detector element being kept constant regardless of an incident intensity of radiation.

In particular, a Model Predictive Control (MPC) on the basis of the number and/or energy of the incident photons should be employed to stabilize the total electrical power in the individual detector element or overall in the detector. This also includes a non-linear Model Predictive Control on the basis of a model of the heat flows formed by neuronal networks.

As the electrical power also changes with changing incident and detected radiation intensity in an uncontrolled state, a system which keeps the consumed electrical power constant therefore reacts to changing boundary conditions immediately by means of changing radiation intensity. The delayed symptom of the measured temperature change is therefore no longer corrected, but immediately prevented on the basis of the changing cause of this symptom, a temperature change.

Advantageously, at least one variably adjustable heating element can be used to stabilize the total electrical power of at least one detector element. Therefore, if no electrical power is consumed on account of a lack of radiation intensity in the actual measurement system, this is compensated by the heating element. On the other hand, if the incidence of radiation is at a maximum, then the electrical power of the heating element can be reduced to the maximum so that overall the electrical power of the whole system remains the same. Therefore a proportion of a predefined reference power of the ASIC not consumed in the ASIC is emitted via the at least one variably adjustable heating element. This reference power may be at least 50% of the maximum power, e.g., in a range of 70% to 100%, e.g., 80% to 100%, e.g., 80% to 90%, of the maximum power. It may be particularly favorable if at least one variably adjustable heating element is arranged in or on the circuit arrangement, in particular on the ASIC, so that temperature behavior with the least possible inertia arises.

It is also advantageous if in addition via the at least one variably adjustable heating element a current flow not applied in the sensor material is compensated at predefined radiation intensity with respect to a current flow applied there. The predefined radiation intensity should be more than 50% of the maximum incident radiation intensity, e.g., in the region of 70% to 100%, e.g., 80% to 100%, e.g., 80% to 90%, of the maximum incident radiation intensity.

The measurement for the incident radiation intensity is determined by the circuit arrangement, in particular by the ASIC. Various metrics may represent this, such as for example a counting rate, a signal current or a total power consumption of the LSBs of the digital counter cells. However, the incident radiation intensity or a counting rate ascertained by the ASIC may be used as a measured value for changing heat input requiring compensation over at least one means of heat generation to at least one detector element.

In some embodiments, the stabilization of the electrical power over several detector elements, e.g., over a detector module composed of several detector elements, can be averaged. Alternatively, however, stabilization of the electrical power is also possible individually for each detector element.

In some embodiments, in addition a temperature measurement can be performed in at least one detector element and additional control of the temperature via temperature measurement, for example, via a PI or PID control circuit, in the sense of a fine adjustment.

Particularly rapid and precise control can be achieved with a model-based predictive control, if the underlying model includes the known heating capacity and the heat flows.

In addition it is advantageous if at least during operation of the detector, heat dissipation is performed. On the one hand, this can be kept constant, but there is also the option of controlling this in such a way that as small a constant proportion as possible is produced by the electrical power supplied to the detector. Likewise a model-predictive control can be used for this so that at the same time as a reduction of the heat dissipation the constant proportion of thermal output which can be influenced in the detector is lowered to keep the balance of heat generation and heat dissipation in the detector as constant as possible.

For example, a cooling air flow or at least one Peltier element can be used for heat dissipation.

In some embodiments the control of the electrical power and/or thermal output is averaged over several detector elements on the basis of the changing radiation intensity, while fine adjustment via the temperature sensor takes place over a smaller spatial area, in particular per detector element.

Other embodiments provide an X-ray detector of a CT system, with a variety of two-dimensionally arranged detector elements with a sensor material which converts incident photons of radiation directly into free charge, a variety of circuit arrangements, in particular ASICs (ASIC=Application-Specific Integrated Circuit), by means of which the number of incident photons is determined in relation to predefined energy ranges, in particular to imaging, wherein a means to influence the overall power of at least one detector element is available for temperature stabilization, by means of which the overall power input is kept constant in at least one detector element.

In this X-ray detector the means to influence the overall power of at least one detector element can be advantageously arranged as an exclusively heat-generating circuit arrangement in or directly on the circuit arrangement, in particular on the ASIC.

To influence the heat budget a control system can be provided which controls the power of the heat-generating circuit arrangement as a function of the other power consumption of the circuit arrangement, in particular of the ASIC, and/or of the sensor material. Moreover, an additional control can be provided which at least partially overlaps the control as a function of a measured temperature on or in the detector element.

Furthermore, it is also pointed out that in addition the constant proportion of the heat flow can also be controlled. For example, it is possible to reduce the cooling and constant thermal output at the same time automatically slowly until the signal-induced fluctuations can barely be intercepted with sufficient certainty. As a result, unnecessarily opposed constant heating and cooling power can be avoided. In particular, this can be part of an adaptive, predictive heating and cooling control system.

In particular, it can also be favorable to start with a rather high and broadly constant initial value at the start of a scan as the signal-related fluctuation range is still unknown. Furthermore, this initial value can be specifically adapted to the pending examinations, such as for example by the tube parameters current and voltage, prior knowledge about the patient size from a topogram, etc.

Furthermore, it is also explicitly mentioned that the control time constants of heating and cooling may be different. Heating reacts rapidly and compensates short-term, signal-dependent temperature fluctuations in the millisecond range. However, cooling reacts more slowly in the second range and guarantees the adequate dissipation of the current constant thermal output.

Example embodiments are described in more detail with the aid of the figures, wherein only the features necessary for an understanding of such embodiments are shown. The following reference characters are used: 1, 1.1-1.20: detector element; 2: sensor; 3: support; 4: heating element; 5: temperature sensor; 6 ASIC; 10: radiation-related heat input $W_1$; 11: control/regulation with target: $W_1+W_2$=constant; 12: heating element in the detector element; 13: heat input $W_2$ by means of heating element; 14: long-term regulation with target: T=constant; 15: temperature T; 16: temperature sensor in the detector element; 17: heat dissipation $W_{out}$ by means of cooling; 18: control with target: T=constant; 19: measurement for input heat; C1: CT system; C2: first X-ray tube; C3: first detector; C4: second X-ray tube; C5: second detector; C6: housing; C7: C-arm; C8: examination table; C9: system axis; C10: control and computing system; D: detector; I: radiation-related current; L: air ducts; P: patient; $Prg_1$-$Prg_n$: computer programs; U: voltage; $W_1$: radiation-related heat input; $W_2$: heat input by heating element; $W_{out}$: heat flow; y: radiation.

FIG. 1 shows a design of a detector element 1 with directly converting sensor material, in which a radiation-induced current I arises between the negative potential with the voltage U and the earth, according to an example embodiment. Both through the energy input of the radiation y as well as through the generated current I in the sensor material, depending on the respective radiation intensity seen from the detector element, a different amount of heat is generated. At the same time, for example, by means of the support 3 to which the sensor 2 is attached, constant heat dissipation $W_{out}$ takes place. Additional heat-generating circuits, in other words, heating elements 4, are now arranged in the area of the ASIC arranged between the support 3 and the sensor 2, the thermal output of which is kept so high at low incident radiation intensity that the heat input arising at maximum radiation intensity is compensated while at high radiation intensity accordingly the thermal output of the heating element(s) is reduced to zero. In this way a constant balance is created between heat dissipation $W_{out}$ and input heat, which leads to an overall constant uniform temperature of the sensor 2 and thus to optimum thermal stability. By this means all temperature-dependent drift phenomena can be eliminated. In addition, another temperature sensor 5 is arranged in the ASIC layer 6, which can be used to adjust the estimates regarding the arising radiation-induced heat input or regarding other ambient conditions.

FIG. 2 shows a cross-section through a schematic diagram of a detector D with a variety of detector elements 1.1 to 1.20. Each individual detector element 1.1-1.20 corresponds to the design in FIG. 1, wherein in addition to the generation of uniform heat dissipation between the detector elements air ducts L are arranged which generate uniform heat dissipation. Cooling air is supplied from above to the detector elements via additional air ducts L and accordingly dissipated from the detector D below. Here too for the stabilization of a constant heat budget the absence of radiation-induced heat in the sensor material 2 in detector elements, which are only exposed to low radiation intensity, is compensated by heating elements in the ASIC layer 6—not shown in detail here. The actual amount of heat which is generated on the respective detector element by radiation and the current individually generated there in the sensor 2 of the detector element 1, can be determined either indirectly via the measured radiation y on the detector element 1, wherein with the aid of temperature sensor 5 corrections regarding the estimated heat input can be made. The temperature sensor 5 can also serve to compensate long-term fluctuations in the heat flow inside the detector on account of changing ambient conditions or changing ventilation conditions. The control measures or regulation measures necessary for this can, for example, be assumed by the control and computing system C10 available in an X-ray system anyway.

Figure 4:
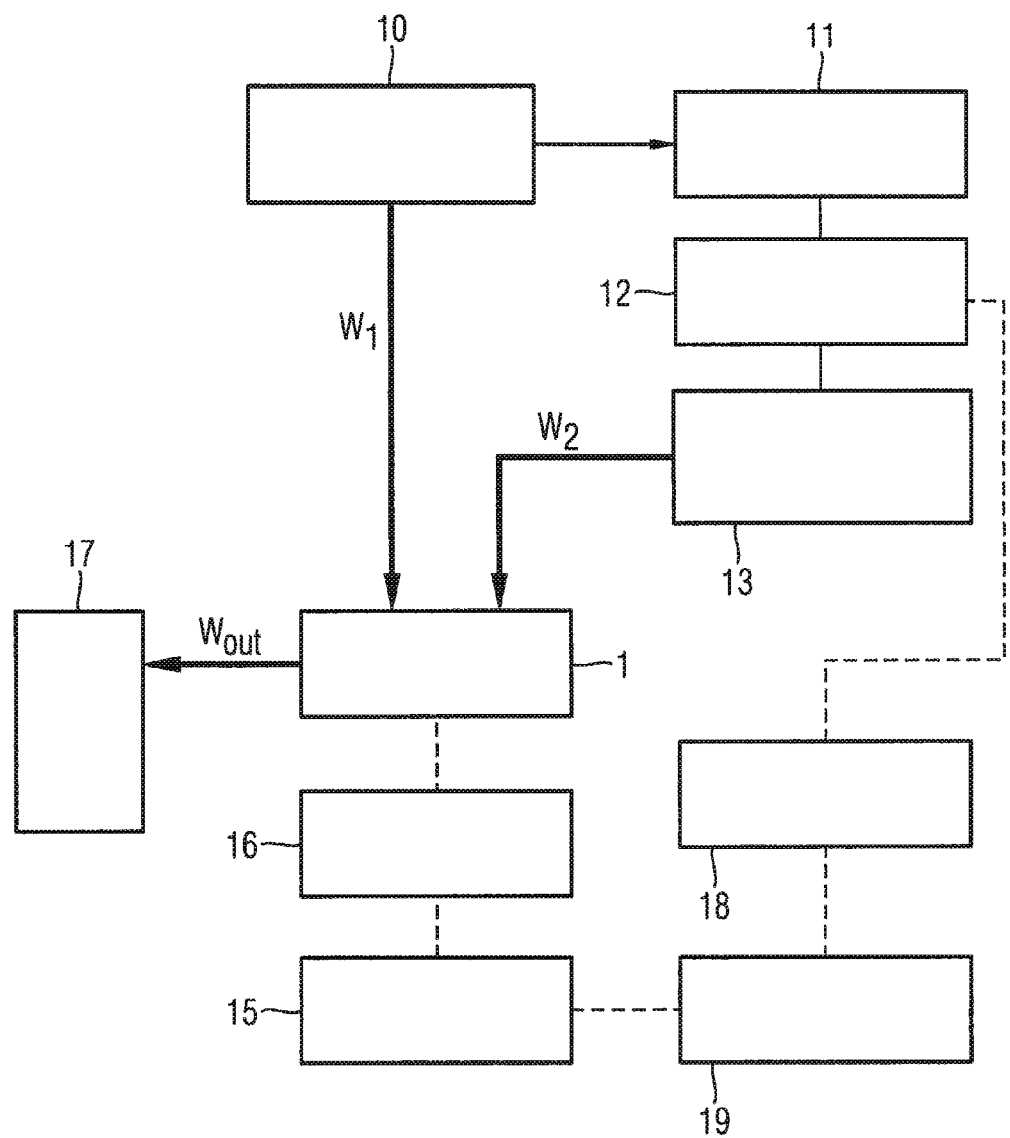
FIG. 4 shows a schematic diagram of heat control of a detector element.

FIGS. 3 and 4 each show schematic diagrams of a heat regulation system and/or heat control system of a detector element D, wherein the radiation-related heat input $W_1$ is used respectively as the essential control and regulation variable.

Figure 5:
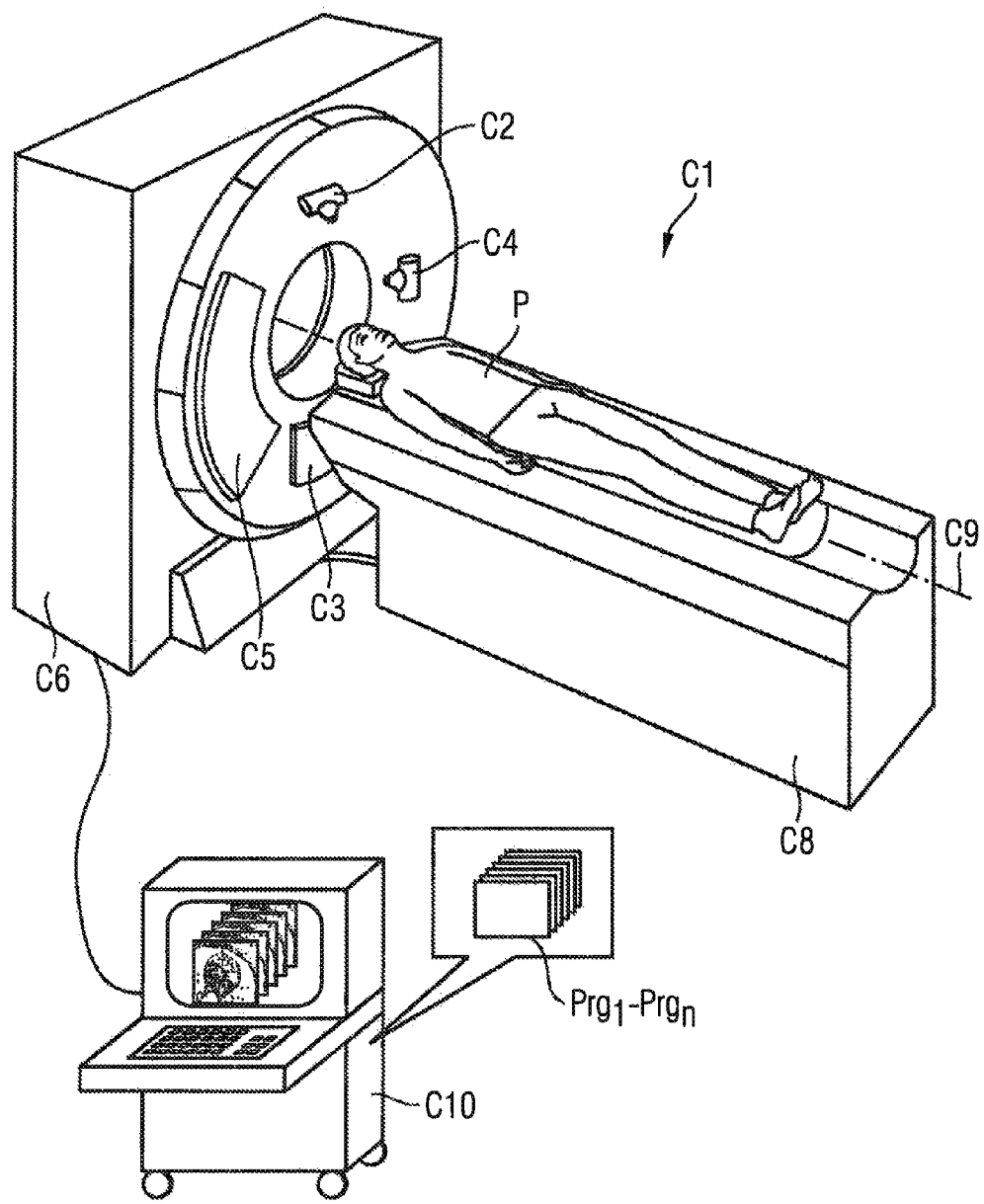
FIG. 5 shows a CT system with detector according to an example embodiment.

An application of a detector for a CT system designed according to an example embodiment is shown in FIG. 5. This describes a CT system C1 with a gantry housing C6, in which on the gantry two emitter-detector systems, including a first X-ray tube C2 with a detector C3 opposite and in addition a second X-ray tube C4 with a second detector C5 opposite are arranged. In a simple embodiment of the CT system C1, the second emitter-detector system can be omitted.

For scanning the patient P, who is located on an examination table C8 that can be moved along the system axis C9, is pushed continuously or sequentially through the measuring field, and scanned by the rotating emitter-detector systems. On account of the varying absorption of radiation by the patient P on the detector elements of the detector, varying radiation intensities arise, which in turn result in varying heat inputs which in a manner disclosed herein is compensated by radiation-induced control or regulation of heat-generating circuits in the ASIC layer of the directly converting detector elements. The control of the entire CT system C1 including reconstruction of image data, but also control and regulation of the heat budget in the detector, can take place by means of the control and computing system C10 through execution of one or more of the computer programs $Prg_1$-$Prg_n$ stored therein, which reproduce the disclosed method.

Figure 6:
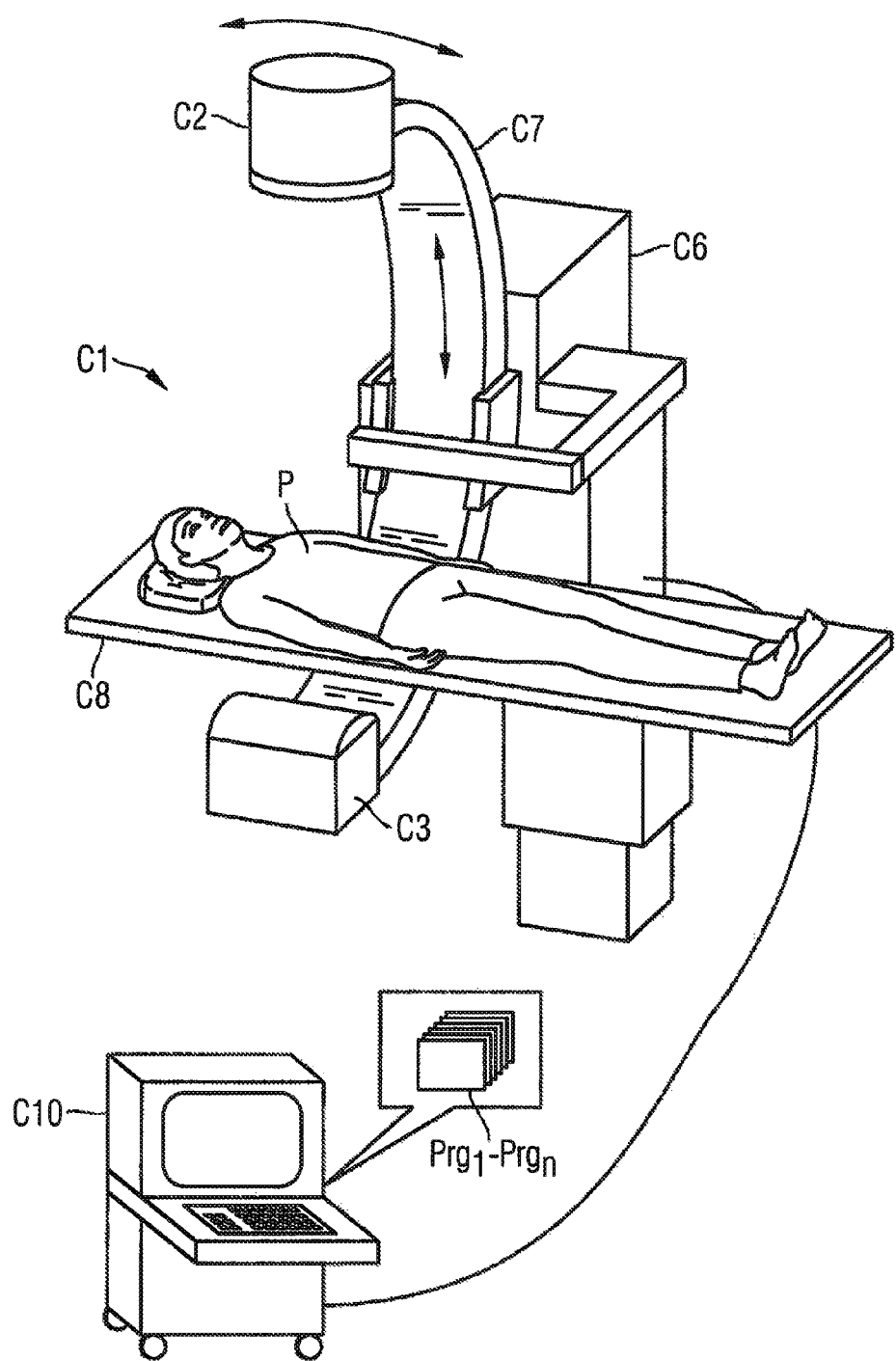
FIG. 6 shows a C-arm system with detector according to an example embodiment.

Accordingly, for example, a directly converting detector according to an example embodiment can be used in a C-arm system C1, as shown in FIG. 6. A C-arm C7 with an X-ray tube C2 and a detector C3 opposite is fastened to a housing C6 in a rotatable manner. To scan the patient P, who is on a sliding examination table C8, the C-arm C7, controlled by the control and computing system C10, is swiveled around the patient P and absorption data is recorded from a variety of projection angles. Here too various radiation intensities are applied to the individual detector elements of the detector C3 during scanning and according to these differences the radiation-induced input amounts of heat in the detector are compensated by heat-generating circuits in a manner as disclosed herein. Here too the control of the entire C-arm system C1 including reconstruction of image data takes place, but also the control and regulation of the heat budget in the detector, by means of the control and computing system C10 through the execution of one or more computer programs $Prg_1$-$Prg_n$ stored therein, which reproduce the disclosed method.

Overall a method for temperature stabilization of at least one detector element of an X-ray detector and an X-ray detector, in particular of a CT system, is therefore proposed, wherein the detector elements use a sensor material which converts incident photons of radiation in the sensor material directly into free-moving charge. The charge quantities generated by the single photons are evaluated by an electronic circuit and the number of incident X-ray photons in relation to predefined energy ranges thus ascertained, in particular in order to use this information for the purpose of imaging. The electronic circuit can be expediently embodied in the form of an ASIC (ASIC=Application-Specific Integrated Circuit). The number and energy of the incident photons may be determined in the process and—without waiting for the effect of the heating—the total electrical power of at least one detector element is immediately kept constant regardless of the incident intensity of radiation.

Although the invention was illustrated and described in more detail by the exemplary embodiment, the invention is not restricted by the disclosed examples and other versions can be derived from this by the expert, without leaving the scope of protection of the invention.

What is claimed is:

1. A method for the temperature stabilization of at least one detector element of an X-ray detector of a CT system, comprising:
the detector elements using a sensor material to convert incident photons of radiation directly into free-moving charge in the sensor material,
using a first circuit arrangement to determine a number of incident photons in relation to predefined energy ranges,
wherein the sensor material provides a varying portion of a total electrical power consumption of the at least one detector element depending on the incident photon intensity, and
dynamically controlling one or more electronic elements based on a measured value for the incident radiation intensity such that the total electrical power consumption of at least one detector element is held constant.

2. The method of claim 1, wherein:
a heat-generating second circuit arrangement is arranged in or on the first circuit arrangement,
the method comprises using a control system to control a power of the heat-generating second circuit arrangement of at least one detector element as a function of a power consumption of at least one of the first circuit arrangement and the sensor material of at least one detector element such that the total electrical power of at least one detector element remains constant.

3. The method of claim 1, comprising using a model predictive control based on the number or energy of the incident photons for the stabilization of the total electrical power.

4. The method of claim 1, comprising using at least one variably adjustable heating element for the stabilization of the overall electrical power consumed of at least one detector element.

5. The method of claim 4, wherein at least one variably adjustable heating element is arranged in or on the first circuit arrangement.

6. The method of claim 4, comprising consuming via at least one variably adjustable heating element a proportion of a predefined reference power of the ASIC not consumed in the ASIC.

7. The method of claim 6, wherein the predefined reference power is more than 50% of a predefined maximum power consumption of the at least one detector element.

8. The method of claim 3, comprising using at least one variably adjustable heating element to compensate for a lack of current flow in the sensor material.

9. The method of claim 1, comprising using the incident radiation intensity as a measured value for a changing heat input requiring compensation over at least one heat generation element to at least one detector element.

10. The method of claim 9, comprising using a counting rate ascertained by means of the circuit arrangement as a measured value for the incident radiation intensity.

11. The method of claim 9, comprising:
measuring a current induced by the radiation in the sensor material, and
using the measured current as a measured value for the incident radiation intensity.

12. The method of claim 1, comprising averaging the stabilization of the electrical power over detector elements.

13. The method of claim 1, wherein the stabilization of the electrical power occurs individually for each detector element.

14. The method of claim 1, comprising:
performing a temperature measurement in at least one detector element, and
performing an additional regulation of the temperature using the temperature measurement.

15. The method of claim 14, comprising using a model predictive control to perform the additional control of the temperature.

16. The method of claim 1, comprising providing heat dissipation operating with a constant power at least during the operation of the detector.

17. The method of claim 1, comprising:
performing heat dissipation at least during the operation of the detector, and
dynamically controlling the heat dissipation.

18. The method of claim 16, comprising using a cooling air flow for heat dissipation.

19. The method of claim 16, comprising using at least one Peltier element for heat dissipation.

20. An X-ray detector of a CT system, comprising:
a variety of two-dimensionally arranged detector elements with a sensor material that converts incident photons of radiation directly into free charge,
first circuit arrangements configured to determine a number of incident photons in relation to predefined energy ranges,
wherein the sensor material provides a varying portion of a total electrical power consumption of the at least one detector element depending on the incident photon intensity, and
means for dynamically controlling one or more electronic elements based on a measured value for the incident radiation intensity such that the total power consumed in at least one detector element is held constant.

21. The X-ray detector of claim 20, wherein the means for influencing the total power of at least one detector element comprises a heat-generating second circuit arrangement arranged in or on the first circuit arrangements.

22. The X-ray detector of claim 20, comprising a control system configured to control the power of the heat-generating circuit arrangement as a function of the other power consumption of at least one of the first circuit arrangement and the sensor material.

23. The X-ray detector of claim 20, comprising a heat dissipation device configured to dissipate excess heat during operation.

* * * * *